Nov. 16, 1965  H. A. ZOLLINGER  3,218,536
SYSTEM FOR REGULATING ABOVE-SYNCHRONOUS SPEED OF AN A.C. MOTOR
Filed Jan. 25, 1963  2 Sheets-Sheet 1

WITNESSES
Theodore F. Wrobel
James F. Young

INVENTOR
Howard A. Zollinger
BY
Clement J. Paznokas
ATTORNEY

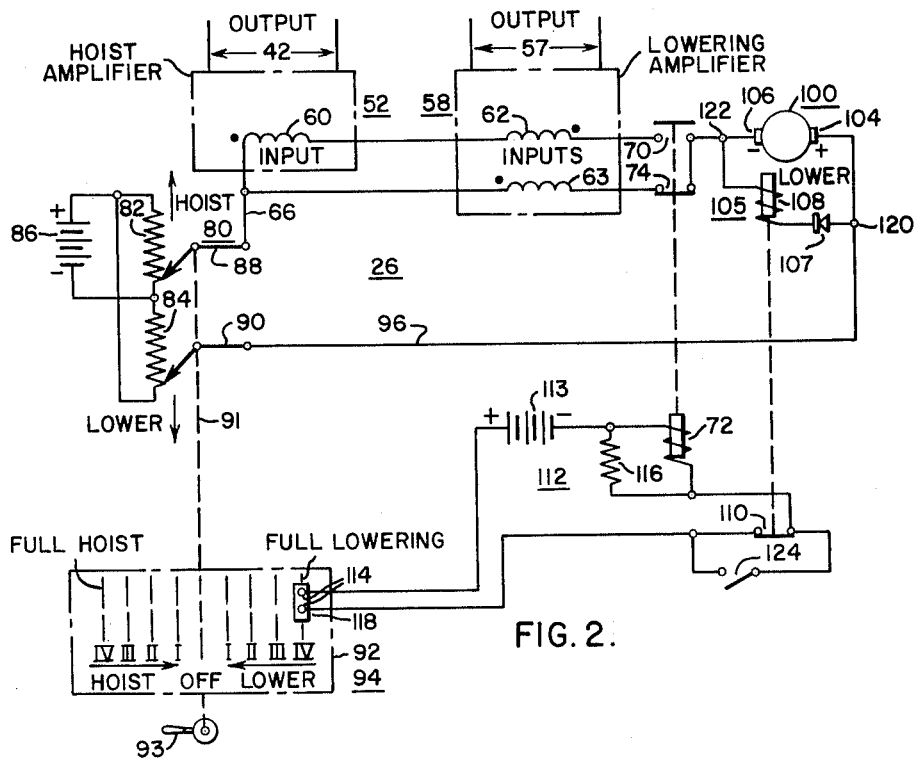

United States Patent Office 3,218,536
Patented Nov. 16, 1965

3,218,536
SYSTEM FOR REGULATING ABOVE-SYNCHRONOUS SPEED OF AN A.C. MOTOR
Howard A. Zollinger, Monroeville, Pa., assignor to Westinghouse Electric Corporation, Pittsburgh, Pa., a corporation of Pennsylvania
Filed Jan. 25, 1963, Ser. No. 253,804
11 Claims. (Cl. 318—203)

This invention relates to a method and a system for controlling the above-synchronous speed of an A.C. (alternating current) motor being overhauled by a load coupled to the motor. More particularly, the invention relates to such control in a hoist system.

Heretofore, practically all induction motor driven hoist systems had the same lowering speed as hoisting speed within 10% or 20%. Higher speeds with loads during lowering are desirable because with the increased lowering speed the overall crane's production can be increased for the same motor horsepower.

There have been attempts, in the past, to make A.C. hoist controls that would provide a high-speed lowering. This has been done by using a large amount of secondary resistance to permit the lowering speed to be increased above synchronous speed, the additional power being absorbed by the added secondary resistance. This type of speed torque curve is not satisfactory. At no load, the motor will run at synchronous speed, and if the drive were set to run at 200% speed with 100% load, there is too great a chance of overspeeding with an overload. Also during acceleration above synchronous speed, the load must not only accelerate the motor and other rotating parts, but must overcome the increasing braking torque produced by the motor as the speed increases.

Any crane control that can offer 180% of synchronous speed during lowering all loads of say 10% and above rated capacity, will increase the production of a crane by 30 to 40%.

Employment of the present invention in a hoist system provides lowering speeds above the motor synchronous speed by variable voltage regenerative braking, and also results in a regulated, flat speed torque curve (constant speed with changing load) at the desired speed. The value of the desired speed above synchronous speed may be easily adjusted by adjusting a reference.

In accordance with one embodiment of the invention, the above-synchronous speed of an induction motor being overhauled by a load is regulated by applying and controlling regeneration-producing excitation to the motor in response to the speed of the motor as compared to a reference.

It is therefore an object of the present invention to provide apparatus and method for controlling the above-synchronous speed of an electric motor coupled to an overhauling load while it is being overhauled by a load.

Other and further objects and advantages of the present invention will become apparent from the following description taken in connection with the accompanying drawings, wherein there is illustrated a preferred form of the invention as embodied in a hoist system. In order to simplify the illustration of the invention, auxiliary equipment, such as breakers, relays, electrical interlocks, brakes etc., usually found in apparatus of the character described is not shown.

In the drawings:

FIG. 2 is a portion of the diagram of FIG. 1 showing the resulting disposition of control elements in the FULL LOWERING mode; and FIG. 3 is a graph showing speed-torque curves illustrating the advantages provided in the FULL LOWERING mode of the apparatus in FIGS. 1 and 2.

Figure 1:
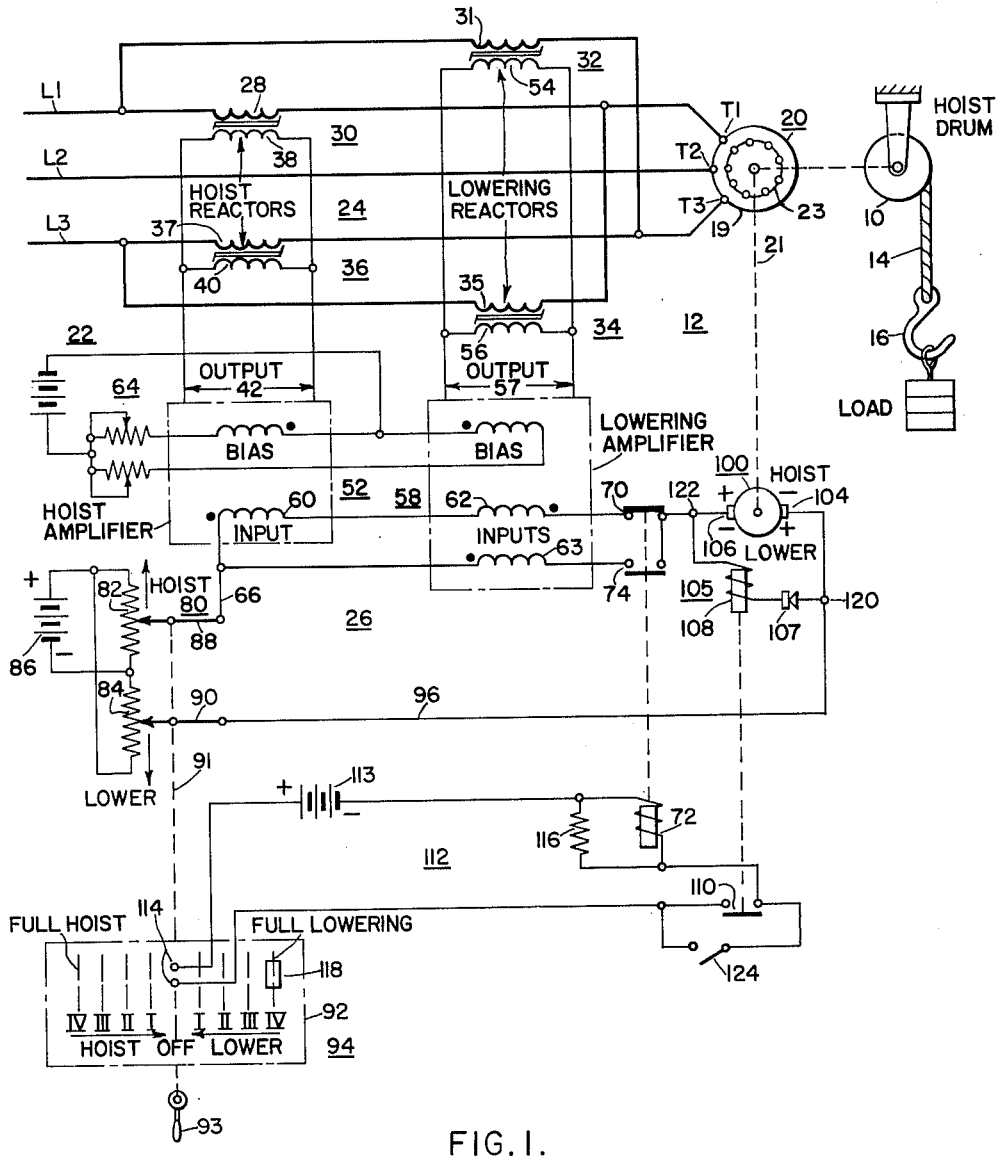
FIGURE 1 is a diagram of a hoist system embodying the invention.

In FIG. 1 of the drawing there is shown a diagrammatic representation of a hoist system including a hoist drum 10 driven by a reversible drive 12. Reeled around the drum is a load lifting cable 14 with a load hook 16 attached to the free end thereof. The drive 12 includes an induction motor 20 which drives the drum 10 through a shaft 21, and a control system 22 for controlling the speed and direction of the motor and thereby of the load, by controlling the electric power supplied from a suitable source to the motor. By way of example, the motor 20 is shown as a three-phase squirrel cage induction motor with a primary (input) winding 19 and a secondary winding 23, the primary winding being supplied from supply lines L1, L2 and L3 connected to a source of three-phase power (not shown).

The control system 22 includes a variable impedance arrangement 24 interposed in the motor 20 supply lines, and controlled in response to a desired load speed reference or command signal B and an actual load speed signal C. These signals are applied as hereinafter described to a summing circuit 26 which controls the variable impedance arrangement 24 to provide speed and reversing control.

More specifically, power line L1 is connected through the main winding 28 of a saturable reactor 30 to a terminal T1 of the motor. Line L1 is also connected through the main winding 31 of a saturable reactor 32 to a terminal T3 of motor 20. In like manner, line L3 is connected to terminals T1 and T3 through the main windings 35 and 37 of saturable reactors 34 and 36, respectively. For convenience, reactors 30 and 36 will be referred to as the "hoist" reactors while reactors 32 and 34 will be referred to as "lowering" reactors. Line L2 is connected directly to terminal T2 of the motor.

Control windings 38 and 40 of the "hoist" reactors 30 and 36 are connected together to the D.C. output 42 of a magnetic amplifier 52 which may conveniently be referred to as the "hoist" amplifier. Likewise, control windings 54 and 56 of the lowering reactors 32 and 34 are connected together to the D.C. output 57 of a magnetic amplifier 58, which may conveniently be referred to as the "lowering" amplifier. It should be apparent that the "hoist" reactors are driven in unison in the same direction by the hoist amplifier 52, either up or down, and that the lowering reactors are driven together in the same direction, either up or down, by the lowering amplifier 58.

Amplifiers 52 and 58 are provided with control windings 60 and 62 respectively, connected in series opposition so that a common signal flowing through these control windings affects the amplifiers in opposite sense. More specifically, a common control signal through the control windings 60 and 62 will tend to drive the amplifiers 52 and 58 in opposite directions, that is, drive one up while the other is driven down or further into cut-off as the case may be. The lowering amplifier 58 has a second control winding 63. A bias circuit 64 is arranged to bias the hoist and lowering amplifiers to cut-off at quiescent. Thus, with no signal in the control windings 60 and 62, the respective amplifiers 52 and 58 do not produce an output and the hoist and lowering reactors will be unsaturated, each presenting maximum impedance in its line. The polarity dot convention employed in the drawing in connection with the hoist and lowering amplifiers signifies that a signal of positive polarity applied at the dotted end of a winding will tend to drive the associated amplifier up, the converse being true when a signal of negative polarity is applied to the dotted end of a winding.

From the foregoing, it should be apparent that a net positive signal applied to a line 66 connected to the control windings 60 and 62 will drive the output of the hoist amplifier 52 upward and tend to drive the output of the lowering amplifier 58 down. This saturates the hoisting reactors 30 and 36, while the lowering reactors 32 and 34 remain unsaturated. Thus the impedances of reactors 30 and 36 are reduced, thereby effectively connecting line L1 to terminal T1 and line L3 to terminal T3, thereby providing a particular phase rotation to drive the hoist motor 20 in the hoist direction. In the meantime reactors 32 and 34 remain at their maximum impedance, and as a result the circuits from L1 to terminal T3 and from L3 to terminal T1 are substantially open circuits.

On the other hand, if a negative signal is applied to the line 66, the lowering amplifier 58 is driven up while the hoist amplifier 52 is held to no output. These conditions saturate the lowering reactors 32 and 34 while the hoist reactors 30 and 36 remain unsaturated, and as a result line L1 is effectively connected to terminal T3 of the hoist motor 20 and line L3 is effectively connected to terminal T1 of the motor, thereby producing a reversed phase rotation to drive the hoist motor in the lowering direction.

In addition, the saturation of the hoist and lowering reactors may be controlled between a minimum and maximum value, thereby controlling the motor torque or speed in the chosen direction by varying its primary excitation voltage.

Control windings 60 and 62 of the hoist and lowering amplifiers are connected in the summing circuit 26 through normally closed contacts 70 of a contactor 72 through all hoist and lowering points except the full lowering point indicated as lowering point IV in the drawing. This point provides a "full lowering" mode of operation during which, windings 60 and 62 are excluded from the summing circuit while winding 63 is connected into the summing circuit by closing normally open contacts 74 of contactor 72, as hereinafter described.

Connected into the mixing circuit 26 is a desired speed reference signal source 80 for supplying to the summing circuit a desired speed reference or command signal B representing a desired direction and speed of the hoist hook 16. In the source 80 there are two parallel connected potentiometers 82 and 84 connected across a D.C. source, for example, the battery shown at 86. Potentiometers 82 and 84 are provided with movable contact arms 88 and 90 ganged together to operate in unison with each other and with the movable drum 92 (developed view) of a drum switch 94. A master controller handle 93 is coupled through a common linkage 91 to the drum 92 and the contact arms 88 and 90. The arrangement is such that when the controller handle 93 is moved into the hoist sector, contact arms 88 and 90 are moved in the hoist direction as indicated by the legend along the linkage line 91, and the drum 92 moves to the right as indicated by the hoist legend and arrow on the drum.

In the same way, when the controller handle 93 is rotated to the lowering side, the potentiometer contact arms are moved in the lowering direction, and the drum 92 is rotated in the lowering direction (leftward). The controller handle 93, contact arms 88 and 90, and the drum 92 are shown in the neutral or OFF position. Potentiometer arm 88 is electrically connected to the dotted ends of control windings 60 and 63, while contact arm 90 is electrically connected to a conductor 96 of the mixing circuit 26.

When the potentiometer arms 88 and 90 are moved to the hoist side (upward from neutral), a positive voltage component is applied to line 66. On the other hand, when the contact arms 88 and 90 are moved to the lowering side (downward from neutral), a negative voltage component is applied to line 66. The magnitude and polarity of the output voltage of source 80, adjustable by the movable contact arms 88 and 90, is selected to correspond with the desired speed and direction of the motor and load movement. Thus the speed and direction of load movement will be dependent on the magnitude and polarity of the voltage supplied by the source 80, which in turn is dependent on the position of the contact arms 88 and 90.

A signal C representing the actual speed of the load hook 16 is injected into the summing circuit 26 by a D.C. tachometer generator 100, which is mechanically coupled to the output shaft 21 of the hoist motor 20. This tachometer provides an output voltage with a magnitude proportional to the motor speed and a polarity dependent on the direction of motor rotation. One output terminal 104 of the tachometer generator is connected to potentiometer contact arm 90 through line 96. The other output terminal 106 of the tachometer generator is connected to one side of normally closed contacts 70 and to one side of normally open contacts 74. In the particular arrangement shown, and as indicated by the legends above and below the tachometer, the tachometer 100 generates a positive voltage at its output terminal 106 when the hoist motor 20 is hoisting, and a negative voltage at terminal 106 when the hoist motor is lowering.

Connected across the output of tachometer generator 100 is a series circuit 105 including a unidirectional valve 107 and the operating coil of a voltage sensitive relay 108, which when energized operates a set of normally open contacts 110 to close a link in an operating circuit 112 for the contactor 72. The circuit 112 includes in series, the operating coil of contactor 72 a source of operating power such as the battery 113, normally open contacts 110 and a pair of normally open contacts 114 in the drum switch 94. When the drum switch 94 is operated to the full lowering position (point IV of lowering), drum switch contacts 114 are closed by a contact segment 118 carried by the drum 92. It is obvious from an examination of circuit 112 that the contactor 72 will be energized and operated when contacts 110 and 114 are closed.

The unidirectional valve 107 is poled to allow current flow through the circuit 105 only when circuit point 120 is positive with respect to circuit point 122. The arrangement is such that the relay 108 is pulled in at a predetermined arbitrary speed in the lowering direction, for example, approximately synchronous speed.

*Operation without high speed lowering circuits*

The system illustrated with the command signal source 80 and the load speed reference source 100 connected into the summing circuit 26, but without the high speed lowering regulating arrangement including circuits 105 and 112, constitutes a well known speed regulated hoist system, i.e., the load speed for any given command or reference speed is maintained constant during hoist operation and all lowering points except high speed or full lowering. The operation of this prior art portion of the system will now be briefly described.

The command or desired speed reference signal B from the command source 80, for any given command direction is opposed in the summing circuit 26 by the actual motor speed signal C produced by tachometer 100 when the motor is running in the command direction. With contacts 70 closed and contacts 74 open, the resultant of the combination of signals B and C is applied to the control windings 60 and 62 of the hoist and lowering amplifiers, whereby these amplifiers respond to the differential between signals B and C, which is the regulating "error" in the system. The magnitude and polarity of the command signal B from the command source 80 is dependent on the desired speed and direction of the command. The magnitude and polarity of the output of tachometer 100 is dependent on the speed and direction of rotation of the hoist motor 20. Thus, the command signal B is proportional to desired speed, while the actual speed signal C from tachometer 100 is proportional to the speed of the hoist motor 20 and load hook 16.

To raise the load hook 16, the master control handle 93 is moved into the hoist sector of the controller range to a selected position corresponding to the desired speed, for example, to the II point on the hoist side. Movement of the handle 93 into the hoist sector moves the switch drum 92 and the potentiometer arms 88 and 90 in unison to their respective hoist sectors. In the hoist area, contact arm 88 taps into the positive side of the potentiometer arrangement to provide a positive command signal B to the line 66 and the dot end of control winding 60, the magnitude of the signal corresponding to the selected command speed. This drives the output of the hoist amplifier 52 upward to saturate the hoist reactors 30 and 36. Since a signal of this polarity tends to drive the lowering amplifier 58 down, this amplifier is held at cut off and the lowering reactors 32 and 34 remain unsaturated and at maximum impedance. The hoist reactors 30 and 36 are saturated to a degree dependent on the magnitude of the command signal B. As a result, the primary of motor 20 is excited in the proper sense or phase sequence to rotate the motor rotor in the hoist direction. As the speed of the hoist motor increases, the output voltage of the tachometer 100, which is opposed in the summing circuit by the command signal, increases until equilibrium is reached wherein enough primary excitation (excitation to the primary of the motor) is supplied to the motor to produce the requisite torque to maintain the selected command speed.

If for any reason, the motor 20 should run faster than the command speed, the tachometer 100 voltage will be greater than the command signal B and the polarity of the resulting error signal will be such as to apply positive voltage to the dot end of control winding 62 and negative voltage to the dot end of control winding 60. The net result of this is a reversal of the phase sequence applied to the motor and a consequent application of counter torque within the motor or "plugging," thus, slowing the motor down until equilibrium is reached at the proper speed and torque.

To lower the load, the command signal B is reversed in polarity by moving the master control handle 93 to the lowering sector, thus moving the potentiometer arms 88 and 90 to the lowering areas of the potentiometer arrangement to produce a positive signal at the dot end of control winding 62 and a negative signal at the dot end of control winding 60, thereby driving the output of the lowering amplifier 58 upward to produce the proper sense or phase sequence of the primary excitation applied to the motor 20 input terminals to rotate the motor in the lowering direction.

In the lowering direction tachometer 100 produces an output voltage which is positive at terminal 104 thereby opposing the command signal B, which for the lowering direction is negative at the potentiometer arm 88 and positive at the contact arm 90 for all lowering points except high speed lowering point IV. As the speed of the loaded hook 16 increases in the lowering direction, the tachometer 100 output voltage increases. If in lowering, the load tends to overhaul the motor, the tachometer 100 voltage C will exceed the command signal B thereby saturating the hoist reactors to reverse the phase rotation or sense of the primary excitation to provide sufficient counter torque to keep the load at the command speed.

*Operation with high speed lowering circuits*

When the operator desires to lower at high speed, the master control 93 is moved to the high speed lowering position, which in the example shown is lowering point IV. As shown in FIG. 2, movement of the master control 93 to the lowering point IV or high speed lowering position, moves the drum switch segment 118 to a position where it bridges contacts 114. Also in the full (high speed) lowering position of the master controller the potentiometer contact arms 88 and 90 are in their farthest lowering position (FIG. 2) whereby the reference source 80 provides a high voltage reference signal which is positive at contact arm 90 and negative at contact arm 88. When the lowering load reaches the predetermined speed at which the tachometer 100 generates sufficient voltage to pick up relay 108, this relay is picked up as shown in FIG. 2, thereby closing contacts 110 to close circuit 112 and energize the operating coil of contactor 72.

In response to the energization of contactor 72, contacts 70 are opened and contacts 74 are closed as shown in FIG. 2. Opening of contacts 70, opens the circuit to control windings 60 and 62, and the closing of contacts 74 connects the regulating circuit through control winding 63 of the lowering amplifier 58. Thus the speed regulating control circuit using both hoist and lowering amplifiers is interrupted, and the command reference signal B and tachometer output signal C are transferred over to just the lowering amplifier 58. It should be noted in this connection, that potentiometer arm 88 is connected to the dot end of winding 63, thus applying a high reference voltage of negative polarity to the dot end of winding 63. This causes the lowering amplifier 58 to cut off, thereby permitting the loaded hook 16 to free-wheel above synchronous speed.

The tachometer 100 output C opposes the reference voltage B and increases as the above-synchronous speed of the motor increases. At a predetermined above-synchronous speed, depending upon the magnitude of the reference voltage as set by the master control, the tachometer output C overrides the reference, thereby driving the output of the lowering amplifier 58 up. This in turn reduces the impedance of the lowering reactors 32 and 34 (the hoist reactors 30 and 36 remain unsaturated) thus to apply primary excitation to the motor in the proper sense or phase sequence to provide field flux that rotates in the same direction as motor rotation, thereby producing regenerative braking. The output of the lowering amplifier 58 is driven up by the tachometer output until the primary excitation to the motor is increased sufficiently to increase the regenerative braking in the motor up to a point to stabilize the load speed. When control 93 is moved from full lowering (point IV) to lesser lowering speed (points III, II, I or OFF), a resistor 116, shunted across the operating coil of contactor 72, provides a time delay on drop out of contactor 72, to cause the drive to regenerate during deceleration before the drive goes into countertorque.

An additional feature of polarized relay 108 is that in the event of an interruption of the tachometer circuit between junctions 122 and 120, the voltage relay 108 would drop out and transfer the control from control winding 63 back to control windings 60 and 62 which would provide regeneration at approximately synchronous speed. If this feature were not employed and the master switch handle not quickly brought to the off position the drive could run away to destruction. Operation with less acceleration at full-lowering point IV may be effected by closing a switch 124 to shunt contacts 110. This renders circuit 105 ineffective and contactor 72 is operated as soon as drum segment 118 bridges contacts 114.

In addition to regulated above-synchronous speed, the present invention provides in the lowering direction flat speed torque curves such as they are in any other section of the speed torque curves. The above-synchronous speed is adjustable by selecting the proper reference voltage or alternatively by selecting the tachometer volts per r.p.m.

Speed torque curves illustrating the FULL HOIST and FULL LOWERING modes are shown in FIG. 3. In this figure curve A depicts the apparatus in FULL LOWERING before relay 72 is pulled in, while curve B illustrates the FULL LOWERING characteristics after relay 72 is pulled in. Curve C represents the FULL HOIST mode.

The herein described apparatus provides above-synchronous speed regulation of an induction motor while being overhauled by a load coupled to the motor. As described herein this is accomplished by an arrangement responsive to the motor speed for applying primary excitation to the motor in a direction to cause regenerative braking and of a magnitude depending upon the motor speed.

It is to be understood that the herein described arrangements are simply illustrative of the principles of the invention, and that other embodiment and applications are within the spirit and scope of the invention.

I claim as my invention:

1. Apparatus for controlling the above-synchronous speed of an A.C. motor while it is being overhauled by a load coupled to the motor, said apparatus comprising means for applying to the input of said motor, while the motor is running at above-synchronous speeds, excitation in response to a condition of said load occurring at above-synchronous speeds of said motor, said excitation being of a sense to produce regenerative braking in the motor and of a magnitude which varies in response to variation in said condition.

2. Apparatus for controlling the above-synchronous speed of an induction motor while it is being overhauled by a load coupled to the motor, said motor having primary winding means, said apparatus comprising means for applying to said winding means, while the motor is running at above-synchronous speeds, excitation of a sense to produce regeneration in the motor and of a magnitude which is a function of the speed of the motor and which varies in response to the motor speed in such manner that a rise in motor speed will increase said magnitude and a drop in motor speed will decrease the magnitude.

3. In a system having an induction drive motor and a control system for selectively operating said motor in any one of a plurality of modes, said motor having primary winding means, selectable means responsive to the selection thereof for operating said motor in a particular direction mode, said selectable means comprising means for applying excitation to said winding means in a particular sense to drive the motor in said direction, means responsive to said motor above a particular speed in said direction for cutting off said excitation to permit a load coupled to said motor to free-wheel above synchronous speed in said direction, and means responsive to predetermined above-synchronous speeds of said motor in said direction for applying to said primary winding means excitation of said particular sense and of a magnitude which is a function of the speed of the motor and which varies in response to the speed of said motor in such manner that an increase in motor speed will increase said magnitude and a decrease in speed will decrease the magnitude, said particular speed being below said predetermined above-synchronous speeds.

4. In a system having an induction drive motor and a control system for selectively operating said motor in any one of a plurality of modes, said motor having primary winding means, selectable means responsive to the selection thereof for operating said motor in a particular direction mode, said selectable means comprising means responsive to speeds above a predetermined above-synchronous speed of said motor in said direction for applying excitation to said primary winding means in a sense to produce regenerative braking in said motor and in magnitude which varies in response to the speed of said motor in such manner that a rise in motor speed will cause an increase in said excitation, and a drop in motor speed will cause a decrease in said excitation.

5. In a hoist having an induction drive motor and a control system for selectively operating said motor in any one of a plurality of modes, said motor having primary winding means, selectable means responsive to the selection thereof for operating said motor in a particular lowering mode, said selectable means comprising means for applying excitation to said winding means in a particular sense to drive the motor in a lowering direction, means responsive to said motor above a particular speed in the lowering direction for cutting off said excitation to permit a load coupled to said motor to free-wheel above synchronous speed in the lowering direction, and means responsive to speeds above a predetermined above-synchronous speed of said motor in the lowering direction for applying to said primary winding means excitation of said particular sense and in magnitude which is dependent on the speed of the motor and which varies in response to the motor speed in such manner that if the motor speed rises, said magnitude of excitation increases, and if the motor speed drops, said magnitude of excitation decreases, said particular speed being below said predetermined above-synchronous speed.

6. In a hoist having an induction drive motor and a control system for selectively operating said motor in any one of a plurality of modes, said motor having primary winding means, selectable means responsive to the selection thereof for operating said motor in a lowering mode, said selectable means comprising means responsive to a predetermined above-synchronous speed of said motor in the lowering direction for applying excitation to said winding means in a sense to produce regenerative braking in said motor and in magnitude which is dependent of the speed of the motor and which varies in response to the motor speed in such manner that an increase in motor speed will cause an increase in said excitation and a decrease in motor speed will cause a decrease in said excitation.

7. Apparatus for controlling the above-synchronous speed of an induction motor while it is being overhauled in a particular direction by a load coupled to the motor, said motor having primary winding means, said apparatus comprising excitation means for supplying excitation to said primary winding means in a sense which produces regenerative braking in the motor at above-synchronous speed in a particular direction, means for producing a reference signal which opposes the application of said excitation to the motor, and means responsive to said motor for providing a control signal which increases in magnitude with increase of speed in said direction, means responsive to said control signal being greater than said reference signal for causing said excitation means to apply excitation in said sense to said winding means and in magnitude depending on the difference between the reference and control signals, said control and reference signals being equal at a predetermined above-synchronous motor speed in said direction.

8. In a reversible drive system employing an A.C. motor which for a particular direction of motor travel provides regenerative braking when the motor is traveling in said direction at above-synchronous speed and the motor is excited with the particular sense of excitation required to drive the motor in said direction at sub-synchronous speed, and wherein 1st and 2nd adjustable excitation means supply 1st and 2nd excitation senses, respectively, to said motor to operate the motor in respective opposite directions, control means having 1st and 2nd selectable modes, means responsive to said 1st and 2nd modes for respectively providing 1st and 2nd oppositely sensed reference signals, means for providing a speed responsive signal which is a function of the speed of said motor and whose sense is dependent on the travel direction of the motor, means responsive to said control means in said first mode for providing to each of said excitation means a first resultant control force produced by a combination of said 1st reference signal and said speed responsive signal in opposition to each other, any given sense of said resultant force having opposite control effects on said 1st and 2nd excitation means, whereby a particular sense of said 1st resultant drives only one of said excitation means upward, and the opposite sense of said 1st resultant drives only the other of said excitation means upward, and means responsive to said control means in said second mode for providing to only said one excitation means a second resultant control force produced by a combination of said 2nd reference signal and said speed responsive signal in opposition to each other, said one excitation means being driven upward in response to said second resultant being of said opposite sense.

9. In a reversible drive hoist system employing an A.C. motor which for a particular direction of motor travel provides regenerative braking when the motor is traveling in said direction at above-synchronous speed and the motor is excited with the particular sense of excitation required to drive the motor in said direction at sub-synchronous speed, and wherein 1st and 2nd adjustable excitation means supply 1st and 2nd excitation senses, respectively, to said motor to operate the motor in respective opposite directions, control means having 1st and 2nd selectable modes, means responsive to said 1st and 2nd modes for respectively providing 1st and 2nd oppositely sensed reference signals, means for providing a speed responsive signal which is a function of the speed of said motor and whose sense is dependent on the travel direction of the motor, means responsive to said control means in said first mode for providing to each of said excitation means a first resultant control force produced by a combination of said 1st reference signal and said speed responsive signal in opposition to each other, any giving sense of said resultant force having opposite control effects on said 1st and 2nd excitation means, whereby a particular sense of said 1st resultant drives only one of said excitation means upward to operate the motor in the lowering direction and the opposite sense of said 1st resultant drives only the other of said excitation means upward to operate the motor in the hoisting direction, and means for providing high speed lowering, the latter means comprising means responsive to said control means in said second mode for providing to only said one excitation means a second resultant control force produced by a combination of said 2nd reference signal and said speed responsive signal in opposition to each other, said one excitation means being driven upward in response to said second resultant being of said opposite sense.

10. In a reversible drive system employing an A.C. motor which for a particular direction of motor travel provides regenerative braking when the motor is traveling in said direction at above-synchronous speed and the motor is excited with the particular sense of excitation required to drive the motor in said direction at sub-synchronous speed, and wherein 1st and 2nd adjustable excitation means supply 1st and 2nd excitation senses, respectively, to said motor to operate the motor in respective opposite directions, control means having 1st and 2nd selectable modes, means responsive to said 1st and 2nd modes for respectively providing 1st and 2nd oppositely sensed reference signals, means for providing a speed responsive signal which is a function of the speed of said motor and whose sense is dependent on the travel direction of the motor, means responsive to said control means in said first mode for providing to each of said excitation means a first resultant control force produced by a combination of said 1st reference signal and said speed responsive signal in opposition to each other, any given sense of said resultant force having opposite control effects on said 1st and 2nd excitation means, whereby a particular sense of said 1st resultant drives only one of said excitation means upward, and the opposite sense of said 1st resultant drives only the other of said excitation means upward, and means responsive to said control means in said second mode for providing to each of said excitation means a second resultant control force produced by a combination of said 2nd reference signal and said speed responsive signal in opposition to each other, any given sense of said second resultant force having opposite control effects on said 1st and 2nd excitation means, and means responsive to said control means in said second mode and the speed of said motor being in excess of a certain speed for supplying said second resultant force to only said one of said excitation means and in particular relation thereto while excluding that resultant from said other excitation means, said particular relation being such that said one excitation means will be driven upward in response to said second resultant force being of said opposite sense.

11. In a reversible drive hoist system employing an A.C. motor which for a particular direction of motor travel provides regenerative braking when the motor is traveling in said direction at above-synchronous speed and the motor is excited with the particular sense of excitation required to drive the motor in said direction at sub-synchronous speed, and wherein 1st and 2nd adjustable excitation means supply 1st and 2nd excitation senses, respectively, to said motor to operate the motor in respective opposite directions, control means having selectable hoist and lowering modes, means responsive to said hoist and lowering modes for respectively providing hoist and lowering oppositely sensed reference signals, a generator coupled to said motor for providing a speed responsive signal which is a function of the speed of said motor and whose sense is dependent on the travel direction of the motor, means responsive to said control means in said hoist mode for providing to each of said excitation means a first resultant control force produced by a combination of said hoist reference signal and said speed responsive signal in opposition to each other, any given sense of said resultant force having opposite control effects on said 1st and 2nd excitation means, whereby a particular sense of said 1st resultant drives only one of said excitation means upward, and the opposite sense of said 1st resultant drives only the other of said excitation means upward, and means responsive to said control means in said lowering mode for providing to each of said excitation means a second resultant control force produced by a combination of said lowering reference signal and said speed responsive signal in opposition to each other, any given sense of said second resultant force, having opposite control effects on said 1st and 2nd excitation means, polarized switch means operated by said generator in response to said motor exceeding a predetermined speed in the lowering direction, and means responsive to said control means in said lowering mode and to said switch means when operated for supplying said second resultant force to only said one of said excitation means in such relation while excluding that resultant from said other excitation means, that said one excitation means will be driven upward in response to said second resultant force being of said opposite sense.

References Cited by the Examiner
UNITED STATES PATENTS

| | | | |
|---|---|---|---|
| 2,440,319 | 4/1948 | Wickerham | 318—211 |
| 2,459,320 | 1/1949 | Hunter et al. | 318—209 |
| 2,774,020 | 12/1956 | Griffes | 318—203 |
| 2,774,023 | 12/1956 | Griffes | 318—203 X |
| 2,785,362 | 3/1957 | Harding et al. | 318—376 X |
| 2,846,631 | 8/1958 | Vogt | 318—203 X |
| 3,029,372 | 4/1962 | Vogt | 318—382 X |

ORIS L. RADER, *Primary Examiner.*